Dec. 17, 1940.    G. N. FRANKS    2,225,397

COTTON FAN

Filed Jan. 24, 1940

Inventor
G. N. FRANKS
By
Attorneys

Patented Dec. 17, 1940

2,225,397

UNITED STATES PATENT OFFICE 2,225,397

COTTON FAN

Gerald Nathan Franks, Leland, Miss.

Application January 24, 1940, Serial No. 315,389

8 Claims. (Cl. 302—37)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to improvements in cotton fans of the centrifugal type in which the material operated upon is passed directly through the fan casing.

Heretofore, in certain types of centrifugal fans for handling seed cotton, cotton seed, gin lint, debris and by-products thereof, the materials pass directly through the blades of the fan, or impinge upon a flat perforated disc or foraminous guard secured to the blades. This arrangement occasions a head-on impact which results in cracking, shattering, roping or twisting, and other undesirable effects upon the materials. My invention eliminates such a head-on impact and permits the handling of extremely dry seed cottons and cotton seed at high inlet velocities without damage.

In general, this invention provides a simple and effective pneumatic cushion at a critical location for eliminating physical contact between the material and the fan wheel guard, such location being the zone where the heaviest impacts would otherwise occur. The material being operated upon changes direction from the inlet to the outlet of the fan by a series of easy diversions, rather than through violently abrupt turns.

In addition to the above objects and advantages, one of the inherent advantages of my invention is that it results in greater mechanical efficiency of the fan.

The following description, considered together with the accompanying drawing, will disclose this invention more fully, its construction, arrangements, and operations of parts, and further objects and advantages thereof will be apparent.

Figure 2:
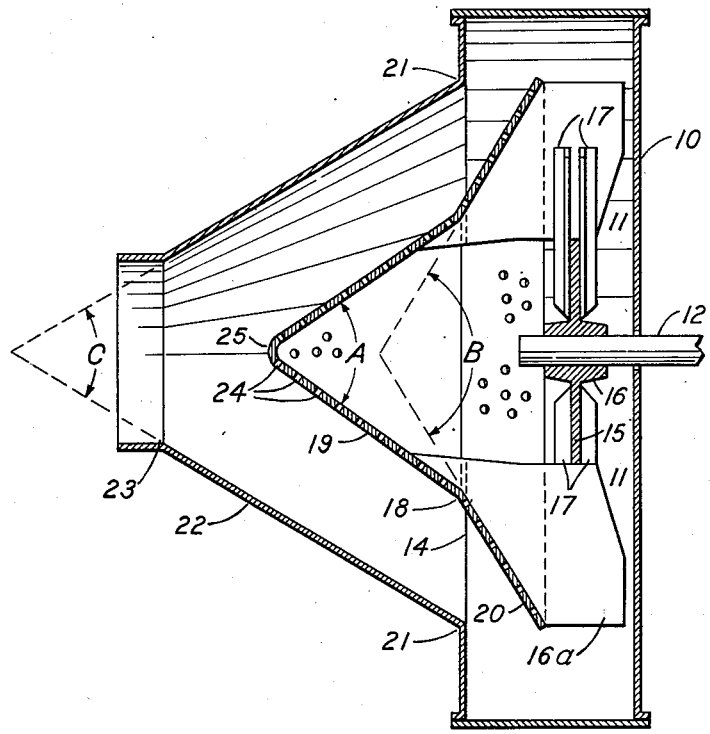
Figure 2 is a section along the line 2—2 of Figure 1.
Figure 3:
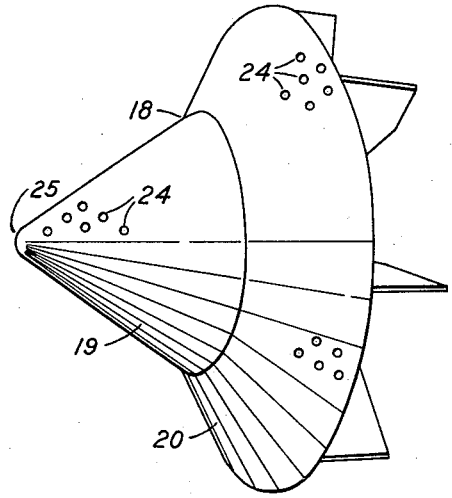
Figure 3 is a perspective of the fan wheel and guard removed from the casing.

Referring with more particularity to the drawing, in which like numerals designate like parts, the embodiment illustrated comprises a suitable fan casing 10 having a fan wheel indicated generally at 11 fixed to a shaft 12, said shaft being rotatably mounted and having one end projecting through the casing for a power connection.

The outlet of the fan is designated by the numeral 13 and the inlet by the numeral 14. The fan wheel assembly comprises, as usual, a disc 15 attached to a hub 16 to which disc blades 16a are secured by means of radial reinforcing members 17. The inlet 14 is preferably substantially equal to or slightly less than the diameter of the fan wheel.

On the inlet side of the fan wheel there is secured to the wheel a foraminous guard designated generally by the numeral 18 having the general shape of a compound cone. The apex angle A of the forward cone 19 should be 45° to 90°, preferably 68°. The apex angle B of the rearward truncated cone 20 should be 45° to 170°, but preferably 120°. It has been observed that where a flat type guard is employed the greatest wear on the guard develops in a circular band, termed the "ring of wear," concentric with the disc and disposed about half way between the periphery of the fan wheel and the center. Consequently, the cones 19 and 20 should not intersect at a point farther away from the center than the smaller circle of the "ring of wear," preferably just inward of this circle. The blades 16a of the fan wheel extend toward the inlet 14 to support guard 18, and the guard 18 is fixed to the blades 16a by any suitable means, such as welding. The larger end 21 of a conical transition 22 is secured about the inlet 14, the narrower end 23 terminating forward of the guard 18. The apex angle C of the transition 22 depends upon the apex angle A, but is generally less than apex angle A. For the preferred value of 68° for the angle A, the angle C should be about 60°. However, this angle may vary from 40° to 95° depending upon the value of the angle A.

It is preferred that the perforations 24 of the guard 18 be approximately ⅛ inch in diameter (holes of this size are subject to less "hairing-over" than larger holes) and equilaterally spaced at 3/16 of an inch between centers. The nose 25 of the cone 19 should preferably be rounded rather than pointed, since a sharp point at this place has been found to create a collecting focus.

Figure 1:
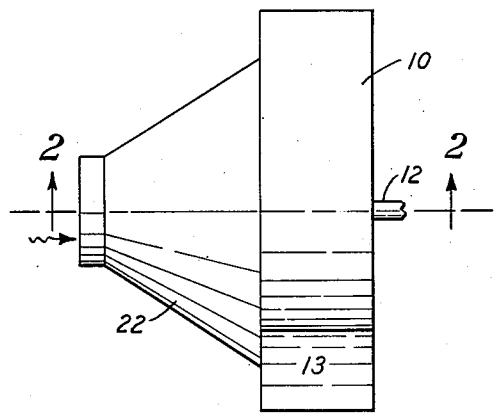
Figure 1 is a side elevational view of a conventional fan modified in accordance with an embodiment of my invention.

In operation the fan wheel is rotated in the usual manner, the direction of the air-borne material being as indicated by the directional arrow in Figure 1. As the material passes into the transition 22, it is subjected to expansion, whereby the velocity is correspondingly reduced. This also reduces the momentum of the material. Some of the material strikes the cone 19 at a glancing contact not exceeding an angle of incidence of one-half of angle A. However, stroboscopic observation has shown that in most cases this contact is almost tangential when the preferred values of the angles A, B, and C, indicated above, are employed. As the fan wheel 11 rotates, carrying with it the guard 18, the extended portions of the blade within the guard causes a continuous current of air to flow outward through the perforations of the guard between said extended portions. As the material glances off of the cone 19, it is directed into the streams of air flowing out through the perforations between these extended blade portions and, consequently, a direct contact between the material and this portion of the guard is avoided. The air flowing outward at this point consequently acts as a cushion, more specifically a pneumatic cushion, so that any further change of direction of the material is made against this pneumatic cushion.

Actual tests have shown that this improvement results in approximately a 10% greater mechanical efficiency than other comparable types of cotton handling centrifugal fans. Heretofore, experiments have indicated that fans of this type cannot successfully operate on inlet velocities in excess of 4,000 linear feet per minute without inducing the cracking and shattering of cotton seed. However, the above-described invention has been successfully employed at inlet velocities as high as 5,000 linear feet per minute without producing damage.

Two general factors are responsible for the successful operation of this invention, namely, the cushioning effect of the cone 20 and the fact that the path of the material being operated upon changes from one direction to the other gradually rather than abruptly, thereby reducing acceleration forces. In view of this latter factor, this invention may be modified in instances where inlet velocities are not high or other favorable conditions permit it by using a cone 20 which is not perforated, thereby doing away with the cushioning effect and depending solely on the gradual directional change factor. While such a modification is not as satisfactory as the preferred embodiment illustrated and above described, it may be resorted to without departing from the spirit of this invention.

Having thus described my invention, I claim:

1. In a centrifugal fan having an inlet disposed axially on one side of the fan wheel, said fan wheel having a plurality of blades, a foraminous guard secured to the inlet side of said wheel, said guard being of the general shape of two intersecting co-axial cones, one of said cones being adjacent the fan wheel and being truncated, the other cone being surmounted on the truncated cone and having a smaller apex angle than the truncated cone, said fan blades having portions extending within the guard.

2. The combination with a centrifugal fan having a fan wheel, an inlet disposed axially on one side of the fan wheel, said fan wheel having a plurality of fan blades; of a foraminous guard secured to the inlet side of said wheel, said guard being of the general shape of two intersecting co-axial cones, the cone adjacent the wheel being truncated and having a larger apex angle than the other cone, the locus of intersection of said cones being concentric with the axis of the cones, between said axis and the periphery of the fan wheel, said fan blades having portions extending within said guard.

3. A centrifugal fan comprising a casing, a fan wheel, an inlet and an outlet through said casing, said inlet being disposed axially on one side of said wheel, said wheel having a plurality of fan blades, said inlet being substantially equal in diameter to said fan wheel, a foraminous guard axially secured to the inlet side of said wheel, said guard being of the general shape of a compound cone, a divergent inlet transition encasing said guard, said transition being secured to said inlet, whereby the velocity of material entering said transition is reduced.

4. In a centrifugal fan having an inlet disposed axially on one side of the fan wheel, said fan wheel having a plurality of blades, a foraminous guard secured to the inlet side of the wheel, said guard being of the general shape of two intersecting co-axial cones, one of said cones being adjacent the fan wheel and being truncated, the other cone being surmounted on the truncated cone, the apex angle of said truncated cone being 45° to 170° and the apex angle of the other cone being smaller than the apex angle of said truncated cone in the range of 45° to 90°, said fan blades having portions extending within said guard.

5. In a centrifugal fan having an inlet disposed axially on one side of the fan wheel, said fan wheel having a plurality of blades, a foraminous guard secured to the inlet side of said wheel, said guard being of the general shape of two intersecting co-axial cones, one of said cones being adjacent the fan wheel and being truncated, the other cone being surmounted on the truncated cone, said truncated cone having an apex angle of about 120°, the apex angle of the other cone being about 68°, said blades having portions extending within said guard.

6. A centrifugal fan comprising a fan wheel having a plurality of fan blades, a casing about said fan wheel, an inlet disposed axially on one side of said fan through said casing, said inlet having a diameter substantially equal to the diameter of said fan wheel, a foraminous guard axially secured to the inlet side of said wheel, said guard being of the general shape of two intersecting co-axial cones, the cone adjacent said wheel being truncated and having a larger apex angle than the other cone, the locus of intersection of said cones being concentric with the axis of the cones between said axis and the periphery of the fan wheel, said fan blades having portions extending within said guard, a divergent transition encasing said guard, said transition being secured to said inlet, whereby the velocity of material entering said transition is reduced before entering the inlet.

7. The combination with a centrifugal fan having a fan wheel, an inlet disposed axially on one side of the fan wheel, said fan wheel having a plurality of fan blades; of a guard axially secured to the inlet side of said wheel, said guard being of the general shape of two intersecting co-axial cones, the cone adjacent the wheel being truncated and having a larger apex angle than the other cone, the latter cone being foraminous.

8. In a centrifugal fan having a fan wheel, an inlet disposed axially on one side of the fan wheel, said fan wheel having a plurality of blades, a foraminous cone secured to said wheel converging outwardly and disposed so as to cover the radial mid-section of said wheel, the blades of said wheel extending within said cone, and another foraminous cone, having a rounded apex, surmounted on said first-mentioned cone.

GERALD NATHAN FRANKS.